US012750701B2

(12) United States Patent
Chen et al.

(10) Patent No.: US 12,750,701 B2
(45) Date of Patent: Sep. 29, 2026

(54) MODEL UPDATING METHOD AND APPARATUS, STORAGE MEDIUM, TERMINAL AND NETWORK DEVICE

(71) Applicant: SPREADTRUM COMMUNICATIONS (SHANGHAI) CO., LTD., Shanghai (CN)

(72) Inventors: Xiaoyu Chen, Pudong New Area (CN); Lifeng Han, Pudong New Area (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 286 days.

(21) Appl. No.: 18/271,355

(22) PCT Filed: Dec. 17, 2021

(86) PCT No.: PCT/CN2021/139035
§ 371 (c)(1),
(2) Date: Jul. 7, 2023

(87) PCT Pub. No.: WO2022/148226
PCT Pub. Date: Jul. 14, 2022

(65) Prior Publication Data

US 2024/0323717 A1 Sep. 26, 2024

(30) Foreign Application Priority Data

Jan. 8, 2021 (CN) ......................... 202110026454.6

(51) Int. Cl.
*H04W 24/04* (2009.01)
*H04W 8/30* (2009.01)

(52) U.S. Cl.
CPC ............. *H04W 24/04* (2013.01); *H04W 8/30* (2013.01)

(58) Field of Classification Search
CPC ............................ H04L 9/3247; G06Q 10/063
See application file for complete search history.

(56) References Cited

U.S. PATENT DOCUMENTS

2013/0260811 A1* 10/2013 Rayavarapu .......... H04W 76/19 455/509
2016/0291940 A1* 10/2016 Searle ................... H04L 67/303
2016/0291959 A1* 10/2016 Searle ................... H04L 41/082
(Continued)

FOREIGN PATENT DOCUMENTS

CN 101877650 A 11/2010
CN 104978209 A 10/2015
(Continued)

OTHER PUBLICATIONS

International Search Report for International Application No. PCT/CN2021/139035; Mailing Date, Mar. 3, 2022.
(Continued)

*Primary Examiner* — Fabricio R Murillo Garcia
(74) *Attorney, Agent, or Firm* — CANTOR COLBURN LLP

(57) ABSTRACT

A model updating method and apparatus, a storage medium, a terminal, and a network device are provided. The method includes: determining whether an update for a locally deployed model is required; and cooperating with a network to update the locally deployed model based on determining that the update for the locally deployed model is required.

19 Claims, 4 Drawing Sheets

(56) References Cited

U.S. PATENT DOCUMENTS

| | | | | |
|---|---|---|---|---|
| 2017/0141968 | A1 * | 5/2017 | Lloyd | H04L 67/55 |
| 2017/0357910 | A1 | 12/2017 | Sommer et al. | |
| 2019/0254107 | A1 * | 8/2019 | Stattin | H04W 76/34 |
| 2021/0019657 | A1 | 1/2021 | Wu et al. | |
| 2021/0044488 | A1 | 2/2021 | Wu et al. | |
| 2021/0056411 | A1 * | 2/2021 | Jung | G06N 3/096 |
| 2021/0076230 | A1 * | 3/2021 | Chen | H04L 5/001 |
| 2022/0272521 | A1 * | 8/2022 | Sihotang | H04W 8/186 |

FOREIGN PATENT DOCUMENTS

| | | | |
|---|---|---|---|
| CN | 105094931 | A | 11/2015 |
| CN | 108596434 | A | 9/2018 |
| CN | 108924910 | A | 11/2018 |
| CN | 109298831 | A | 2/2019 |
| CN | 109313586 | A | 2/2019 |
| CN | 109901860 | A | 6/2019 |
| CN | 110417565 | A | 11/2019 |

OTHER PUBLICATIONS

SIPO 1st Office Action for corresponding CN Application No. 202110026454.6; Issued Mar. 14, 2024; 13 pages.

* cited by examiner

MODEL UPDATING METHOD AND APPARATUS, STORAGE MEDIUM, TERMINAL AND NETWORK DEVICE

CROSS-REFERENCE TO RELATED APPLICATIONS

This is the U.S. national stage of application No. PCT/CN2021/139035, filed on Dec. 17, 2021. Priority under 35 U.S.C. § 119(a) and 35 U.S.C. § 365(b) is claimed from Chinese Application No. 202110026454.6 filed Jan. 8, 2021, the disclosure of which is also incorporated herein by reference.

TECHNICAL FIELD

The present disclosure generally relates to communication field, and more particularly, to a model updating method and apparatus, a storage medium, a terminal and a network device.

BACKGROUND

Artificial Intelligence (AI) technology accelerates intelligence of communication networks. Generalization capability of current AI models is limited. That is, in certain scenarios and conditions, application of AI can enhance functions of traditional communication networks compared with traditional methods. However, in other cases, performance of AI may be degraded, and even lower than that of traditional methods for communication networks. Therefore, the AI models also need to be updated to adapt to changing network environment, capture latest AI technology achievement, improve model accuracy, ensure model performance, and introduce new functional features.

SUMMARY

Embodiments of the present disclosure provide a condition that triggers model updating and a process of model updating.

In an embodiment of the present disclosure, a model updating method is provided, including determining whether an update for a locally deployed model is required; and cooperating with a network to update the locally deployed model based on determining that the update for the locally deployed model is required.

In an embodiment of the present disclosure, a storage medium having computer instructions stored therein is provided, wherein when the computer instructions are executed, any one of the above methods is performed.

In an embodiment of the present disclosure, a terminal including the above apparatus or including a memory and a processor is provided, wherein the memory has computer instructions stored therein, and when the processor executes the computer instructions, any one of the above methods is performed.

DETAILED DESCRIPTION

As mentioned in the background, in the existing techniques, there is no technical solution on how to provide a condition for triggering model updating and a model updating procedure.

Embodiments of the present disclosure provide a model updating method. The method includes determining whether an update for a locally deployed model is required; and cooperating with a network to update the locally deployed model based on determining that the update for the locally deployed model is required.

Therefore, based on determining that the update for the locally deployed model is required, data interaction with a network is triggered to complete update of the locally deployed model.

In order to clarify the objects, characteristics and advantages of the disclosure, embodiments of present disclosure will be described in detail in conjunction with accompanying drawings. It should be noted that the model mentioned in the embodiments of the present disclosure is an AI model which may be configured at a UE and/or a network. The network can configure, upgrade, update, replace or delete (hereinafter collectively referred to as update) the AI model deployed at the UE. The AI model can be used to enhance communication network functions or calculation of signals and/or parameters in communication.

Figure 1:
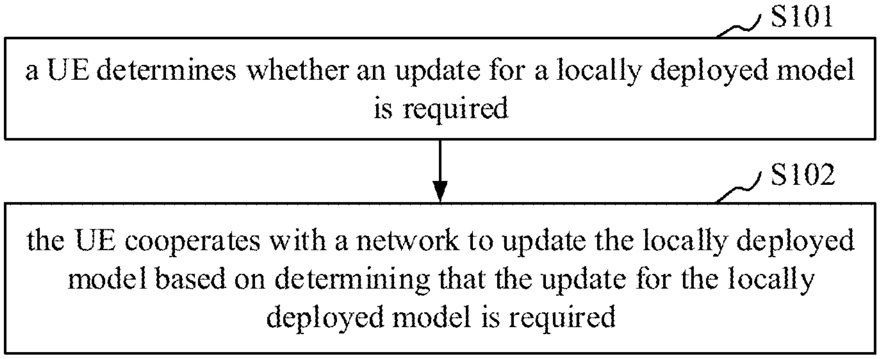
FIG. 1 is a flow chart of a model updating method according to an embodiment.

Referring to FIG. 1, FIG. 1 is a flow chart of a model updating method according to an embodiment. The method includes S101 and S102.

In S101, a UE determines whether an update for a locally deployed model is required.

In S102, the UE cooperates with a network to update the locally deployed model based on determining that the update for the locally deployed model is required.

Optionally, if a determination result in S101 is negative, the operation of updating the model is not performed.

The method in FIG. 1 is performed by a terminal, i.e., the UE. When the UE determines that the update for the locally deployed model is required, a model updating procedure is triggered and the UE performs data interaction with the network to complete the update of the model locally deployed at the UE.

Optionally, when updating the locally deployed model of the UE, the UE first falls back to using a traditional communication algorithm or uses other alternative local AI models.

In some embodiments, prior to said determining whether the update for the locally deployed model is required, the method further includes: obtaining attribute information of the locally deployed model; said determining whether the update for the locally deployed model is required includes: determining whether the update for the locally deployed model is required based on the attribute information; and said cooperating with the network to update the locally deployed model includes: initiating a model updating procedure to the network to interact with the network on update data, wherein the update data is used to update the locally deployed model.

The attribute information is information related to whether the model locally deployed at the UE needs to be updated and includes at least one of following: an identifier of the model, a version number of the model, a validity period of the model, a type of the model, a volume of the model, or accuracy of the model. After the model locally deployed at the UE is updated, the attribute information corresponding to the model is also updated.

The UE may actively trigger the model updating procedure. A trigger mechanism is as follows. If the UE detects that the attribute information of its locally deployed model meets an update condition, the UE triggers the update for the model, and initiates the model updating procedure to the network to establish an interaction procedure for update data with the network. The UE obtains the update data from the network and updates the locally deployed model according to the update data.

If the UE determines that the update for the locally deployed model is required, when in a connected state, the UE initiates the model updating procedure to the network, and includes, in signaling notifying the network (such as RRC signaling), information of a target model that needs to be updated and may also additionally include information of an auxiliary model update. The RRC signaling may be a UEAssistanceInformation message or the like.

Optionally, prior to said determining whether the update for the locally deployed model is required, the method further includes: receiving model information from the network, wherein the model information includes at least one of the identifier of the model, the version number of the model, the validity period of the model, the type of the model, the volume of the model, or the accuracy of the model; and said determining whether the update for the locally deployed model is required based on the attribute information includes: comparing the model information with the attribute information to determine whether an updated model exists in the network; and determining that the update for the locally deployed model is required based on that the updated model exists in the network.

The model information is transmitted by the network to the UE and is used to indicate model information that the network can provide. Optionally, the model information may be carried by RRC signaling or a broadcast message (such as system information) transmitted by the base station.

After receiving the model information, the UE may compare the model information with relevant information (i.e., attribute information) of the locally deployed model to check whether the update for the locally deployed model is required. For example, after the UE receives the model information from the network, if an identifier and a version number of the locally deployed model of the UE are inconsistent with an identifier and a version number of the model provided by the network, the UE determines that the update for the locally deployed model is required, the UE initiates the model updating procedure.

It should be noted that logic for the UE to compare the model information with the attribute information to determine whether the update for the locally deployed model is required includes but is not limited to the above situation, and the logic can be adjusted according to needs of the UE or the network for updating the model.

In some embodiments, the UE may obtain network-supported model information via system information or RRC signaling to enhance awareness of network-supported and updated models. Therefore, when there is a model update on the network, the UE can detect it in time and make a response to initiate the model updating procedure, thereby ensuring performance of the model at the UE.

In some embodiments, based on that the attribute information includes the validity period of the model, said determining whether the update for the locally deployed model is required further includes determining that the update for the locally deployed model is required in response to the validity period of the model expiring.

The validity period of the model means that the model is valid for a certain period but becomes invalid after the certain period. If a usage time of the model exceeds the validity period, the validity period of the model expires. After the network updates a certain model for the UE, the validity period of the model can be configured for the UE. When detecting that the validity period of the locally deployed model expires, the UE triggers an update for the locally deployed model. Alternatively, the validity period of the model may mean that the model is valid before a certain time point, and expires after the certain time point, that is, the validity period of the model may be an absolute time point.

Optionally, after the network updates a certain model for the UE, the UE starts a validity timer locally according to the validity period of the model, and when the validity timer reaches the validity period of the model, the validity period of the model locally deployed at the UE expires. It should be noted that if the timer expires, and the model at the network is not updated, a result of triggering the model updating procedure at this time may only be to restart the validity timer of the model, without occurrence of an actual model updating procedure.

In the embodiments, the UE may trigger the model updating procedure for the model whose validity period has expired, to ensure that the model locally deployed at the UE is in a latest state and to guarantee performance of the AI model and introduction of new features.

In some embodiments, prior to said determining whether the update for the locally deployed model is required, the method further includes detecting performance of the locally deployed model; and said determining whether the update for the locally deployed model is required further includes: determining that the update for the locally deployed model is required in response to the performance of the locally deployed model falling below an expected threshold.

Optionally, the expected threshold is received from the network or is acquired locally. Specifically, the network may transmit the expected threshold of the model to the UE, such as through system information. Alternatively, the UE may acquire a performance value of a traditional communication algorithm (an algorithm that does not use an AI model) and take it as the expected threshold, or the UE may acquire the expected threshold in other ways, which is not repeated here.

In the embodiments, based on comparison, when the performance of the model locally deployed at the UE drops below an expected threshold, the UE may initiate the model updating procedure to the network, which is beneficial to ensure the performance of the model, and prevent serious degradation of the performance of the model from affecting communication performance and reducing user experience.

It should be noted that, for the above-mentioned embodiments, before the validity period of the locally deployed model of the UE expires, if any situation that needs to update the model occurs, the UE can initiate the model updating procedure to the network. When in the model updating procedure, the UE may first fall back to using the traditional communication algorithm, and then switch back to using the AI model after the model updating procedure is completed.

In some embodiments, said determining whether the update for the locally deployed model is required includes: determining that the update for the locally deployed model is required in response to receiving a model updating instruction from the network, wherein the model updating instruction is transmitted to a terminal when the network determines that an update for a model deployed at the terminal is required; and said cooperating with the network to update the locally deployed model includes: interacting with the network on update data, wherein the update data is used to update the locally deployed model.

Alternatively, the model updating procedure of the locally deployed model of the UE may be triggered by the network. The network may transmit a model updating instruction to the UE via a device (such as a base station or an Access Point (AP)) in communication with the UE to instruct the UE to start updating the locally deployed model.

When the network transmits the model updating instruction to the UE, the UE may be in a connected state or in a disconnected state (including an idle state and an inactive state). The network may select different indication ways based on a state of the UE to transmit the model updating instruction to the UE. If the UE is in the connected state, the network may transmit the model updating instruction to the UE through RRC signaling. If the UE is in the disconnected state, the network may transmit the model updating instruction to the UE through paging information or system information (such as System Information Block (SIB)).

Optionally, the model updating instruction is carried by paging information or system information based on the UE being in a disconnected state; and following receiving the model updating instruction from the network, the method further includes: switching from the disconnected state to a connected state to cooperate with the network to update the locally deployed model; and resuming the disconnected state after update for the locally deployed model is completed.

If the UE receives the model updating instruction in the unconnected state, the UE may switch to the connected state to perform the model updating procedure and resume the disconnected state after the update is completed. If the UE is in the idle state before the model updating procedure, the UE may switch to the connected state to perform the model updating procedure and resume the idle state after the update is completed. If the UE is in the inactive state before the model updating procedure, the UE may resume the inactive state after the update is completed.

In the embodiments, different model updating procedures for the UE in the connected or disconnected state are provided accordingly to ensure implementation of model updating at the UE, which may ensure the performance of the model at the UE, provide guarantee for normal operation of communication network functions, and improve user experience.

In some embodiments, the method further includes transmitting relevant information of the locally deployed model to the network, wherein the relevant information enables the network to determine whether the update for the model deployed at the terminal transmitting the relevant information is required.

The relevant information is information related to the model locally deployed at the UE and may include information such as the identifier of the model, the version number of the model, the validity period of the model, the type of the model, the volume of the model, or the accuracy of the model. To ensure that the network is aware of information of the locally deployed model at the UE, the UE may transmit relevant information of the locally deployed model to the network so that the network can store the information. Optionally, the network may transmit the information to a server or a terminal relevant with an AI model, such as an AI entity, for centralized management.

Optionally, the relevant information may exist in RRC signaling, or in an NAS container of RRC signaling, or in a non-NAS container of RRC signaling.

In addition, when an environment where the UE is located causes the performance of the locally deployed model of the UE to degrade, the UE may actively report the relevant information to a base station of a current cell. Further, the network may select an appropriate model for model updating of the UE according to the environment of the UE or a current location of the UE.

Optionally, the relevant information is reported to the network along with a measurement report.

When the UE is in the connected state, relevant information of the model that already exists locally at the UE may be added when the UE reports the measurement report to the network. The measurement report may be a measurement report reported to the network after the UE performs cell measurement or channel measurement. It should be noted that the UE may report the relevant information to the network through other reporting messages.

In the embodiments, the UE may report relevant information of the locally deployed model to the network through the measurement report, etc., to make the network accurately know a situation of the model at the UE, so that the updating procedure is triggered when the network determines that the model at the UE needs to be updated. Therefore, the performance of the model at the UE can be guaranteed, thereby guaranteeing the normal operation of communication network functions, and improving the user experience.

Figure 2:
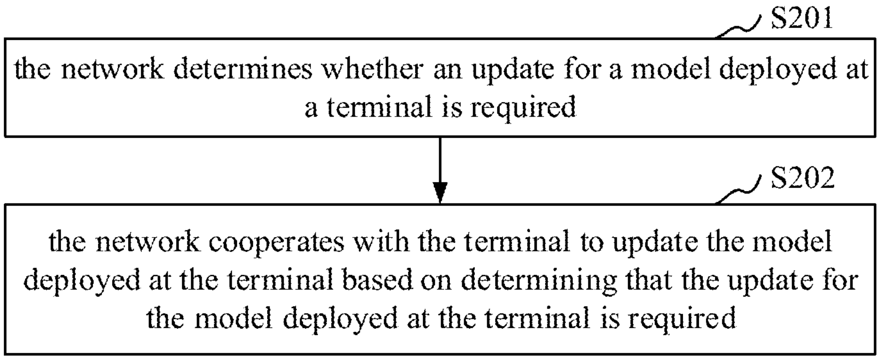
FIG. 2 is a flow chart of a model updating method according to an embodiment.

Referring to FIG. 2, FIG. 2 is a flow chart of a model updating method according to an embodiment. The method may be performed by a network device (such as a base station or an AP) and includes S201 and S202.

In S201, the network determines whether an update for a model deployed at a terminal is required.

In S202, the network cooperates with the terminal to update the model deployed at the terminal based on determining that the update for the model deployed at the terminal is required.

Optionally, the method further includes: determining that the update for the model deployed at the terminal is required in response to receiving a model updating procedure initiated by the terminal; and said cooperating with the terminal to update the model deployed at the terminal includes: interacting with the terminal on update data, wherein the update data is used to update the model deployed at the terminal; wherein the model updating procedure is initiated by the terminal in response to determining that the update for the model deployed at the terminal is required based on attribute information of the model deployed at the terminal.

Optionally, the attribute information includes at least one of following: an identifier of the model, a version number of the model, a validity period of the model, a type of the model, a volume of the model, or accuracy of the model.

Optionally, the method further includes: transmitting model information to the terminal, to make the terminal compare the model information with the attribute information to determine whether an updated model exists in the network, and determine that the update for the model deployed at the terminal is required based on that the updated model exists in the network; wherein the model information includes at least one of the identifier of the model, the version number of the model, the validity period of the model, the type of the model, the volume of the model, or the accuracy of the model.

Optionally, the terminal determines that the update for the model deployed at the terminal is required in response to the validity period of the model expiring.

Optionally, the terminal determines that the update for the model deployed at the terminal is required in response to detecting that performance of the model deployed at the terminal falls below an expected threshold.

Optionally, the method further includes transmitting the expected threshold to the terminal.

Optionally, said cooperating with the terminal to update the model deployed at the terminal based on determining that the update for the model deployed at the terminal is required includes: transmitting a model updating instruction to the terminal based on determining that the update for the model deployed at the terminal is required, to make the terminal determine that the update for the model deployed at the terminal is required; and interacting with the terminal on update data, wherein the update data is used to update the model deployed at the terminal.

Optionally, the method further includes: receiving from the terminal relevant information of the model deployed at the terminal; and said determining whether the update for the model deployed at the terminal is required includes: determining whether the update for the model deployed at the terminal is required based on the relevant information.

Optionally, the relevant information exists in RRC signaling, or in an NAS container of RRC signaling, or in a non-NAS container of RRC signaling.

Optionally, the relevant information is reported by the terminal to the network along with a measurement report.

Optionally, the model updating instruction is carried by paging information or system information based on the terminal being in a disconnected state, to make the terminal switch from the disconnected state to a connected state and resume the disconnected state after update for the model deployed at the terminal is completed.

Optionally, the model updating instruction is carried by RRC signaling based on the terminal being in a connected state.

The method in FIG. 2 is performed by a network device which includes a base station or an AP. More details about a working principle and a working mode of the method in FIG. 2 may be referred to relevant descriptions on the network in FIG. 1 and are not repeated here. When a module (such as an AI entity) deployed by the network to manage the AI model is deployed inside the network device such as the base station, the network device only needs to exchange data with the UE to update the model at the UE.

In some embodiments, the network device includes an AI entity and a base station or an AP, the AI entity is configured to determine whether the update for the model deployed at the terminal is required, and the base station communicates with the terminal and the AI entity.

When a module (such as an AI entity) deployed by the network to manage the AI model is deployed outside the network device such as the base station (gNB is taken as an example below), the network device further needs to exchange data with the module to update the model at the UE.

Figure 3:
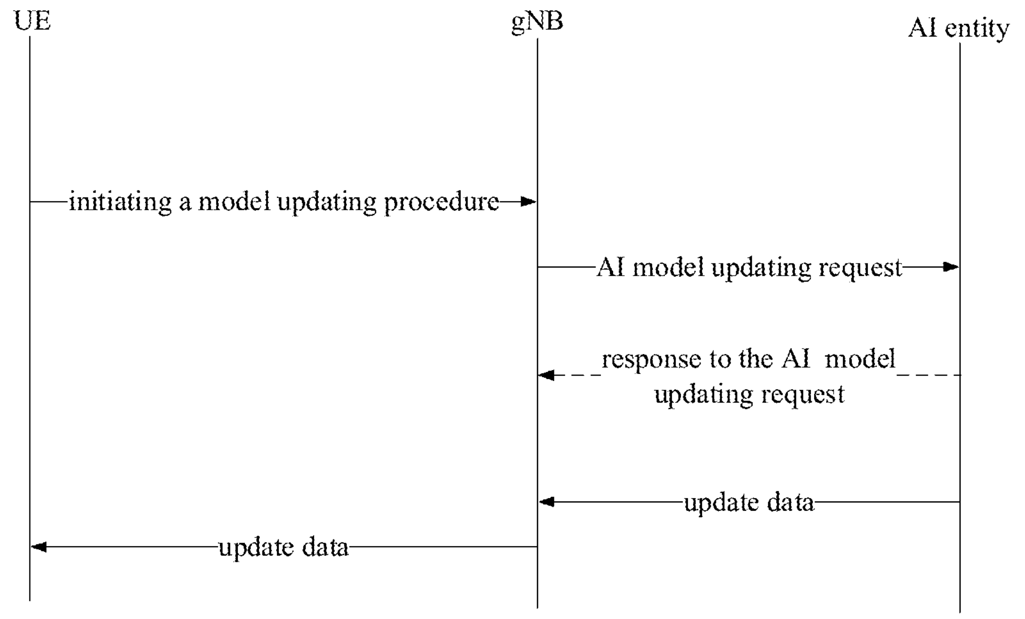
FIG. 3 is an interaction flow chart of a model updating method according to an embodiment.

When the UE actively initiates the model updating procedure to the network according to a situation described in FIG. 1, referring to FIG. 3 which is an interaction flow chart of a model updating method according to an embodiment. If receiving a model updating procedure initiated by a UE, a base station (gNB) transmits an AI model updating request (may be represented by AIModelUpdateRequest) to an AI entity. If supporting corresponding model updating or supports the model the UE requests for updating, the AI entity returns an AI model update request response to base station (may be represented by AIModelUpdateRequestResponse) to inform the base station and transmit update data to the base station (may be represented by AIModelDistribution AIModelUpdate). The base station forwards the update data to the UE, and updates the model deployed at the UE. The method in FIG. 3 may be initiated by the UE in a connected state.

Figure 4:
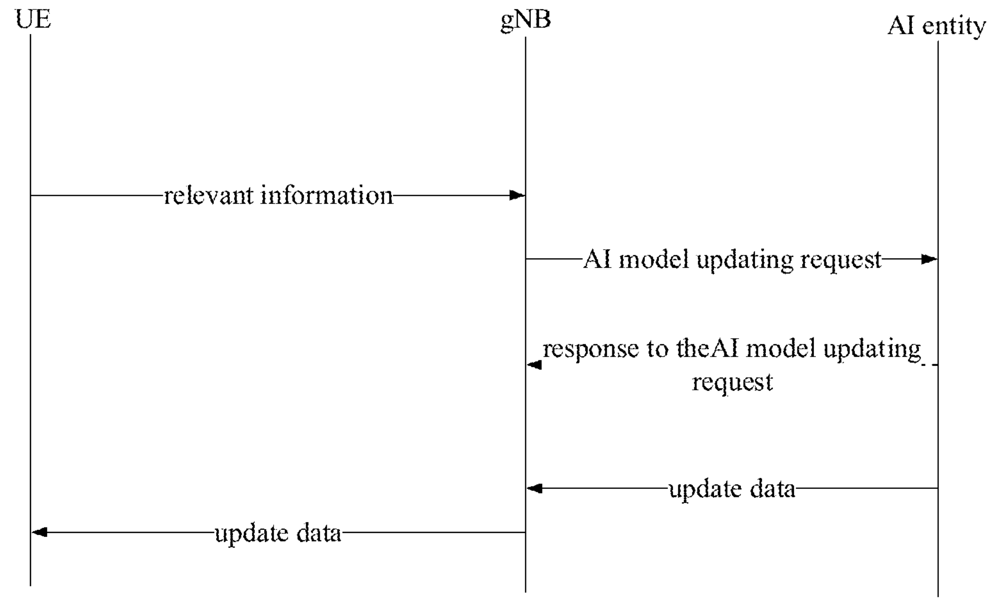
FIG. 4 is an interaction flow chart of a model updating method according to an embodiment.

When the network actively updates the model for the UE according to relevant information of the locally deployed model reported by the UE, referring to FIG. 4 which is an interaction flow chart of a model updating method according to an embodiment. When reporting a measurement report, the UE in the connected state adds the relevant information of an existing model at the UE (may be represented by Measurement Report+ModelInfo). The gNB receives the relevant information reported by the UE, adds state information of the base station to the relevant information, and forwards the added information to the AI entity, for example, through an AIModelUpdateRequest message. The AI entity determines whether to initiate the model updating according to the above information. These parts belong to network implementation and are not described prescriptively in the embodiments. If supporting the model updating or supports the model requested by the UE to update, the AI entity returns a response of AI model updatingrequest (may be represented by AIModelUpdateRequestResponse) to the base station to inform the base station and transmit the update data (may be represented by AIModelDistribution/AIModelUpdate) to the base station. The base station forwards the update data to the UE, and update the model deployed at the UE. Alternatively, the network maintains information about the current model of the UE for the UE in the connected state. When the model on the network is updated, the network may actively initiate a model updating procedure to notify the UE to update the model.

Figure 5:
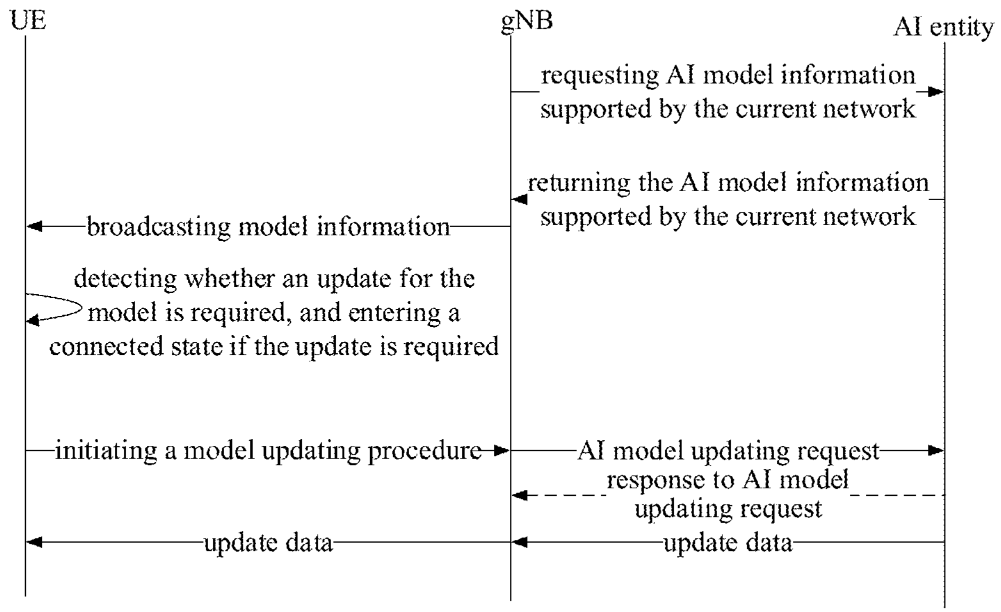
FIG. 5 is an interaction flow chart of a model updating method according to an embodiment.

When the UE is in a disconnected state, the network may also actively trigger the UE to perform model updating. The network may actively trigger the updating procedure according to the situation of transmitting a model updating instruction to the UE in FIG. 1. Referring to FIG. 5 which is an interaction flow chart of a model updating method according to an embodiment. For the UE in an idle/inactive state, the base station and the AI entity exchange model information. The base station requests AI model information supported by the current network from the AI entity, such as through a CurrentModelInfoRequest message. The AI entity returns to the base station the AI model information supported by itself, such as through a CurrentModelInfoResponse message. The base station broadcasts the model information in system information of a cell. The UE receives the model information broadcast by the cell and compares it with model information stored at the UE. If there is a model update, the UE switches to the connected state and initiates a model updating procedure to the gNB, to make the gNB and the AI entity interact according to the procedure as shown in FIG. 3, which actively updates the model. After the model updating is completed, the UE returns to a previous state (the idle or inactive state).

Alternatively, for the UE in the idle/inactive state, the model updating procedure may be triggered by the network (not shown in the figures). The network maintains information of the AI model locally deployed at the UE. After a model at the network is updated, the network may actively initiate the model updating procedure to notify the UE to update the model. For example, the UE is notified to update the model by means of paging. In this case, as the network needs to maintain the current AI model information of the UE, the UE may notify the network every time the model at the UE is updated, so that the network maintains accuracy of the information. For network-assisted UE model update, after the model updating procedure is completed, the network-maintained model information can be updated. However, after the model at the UE is updated without network assistance, the UE needs to actively notify the network of the model information it is currently using.

Based on the methods in FIG. 3 to FIG. 5, interaction procedures of model updating when the AI entity is deployed outside the network device, such as the base station (gNB), is provided, thereby reducing burden of the network device.

For the model updating method provided by the embodiments of the present disclosure, to clarify usage scenarios of the method, following embodiments are provided to include some specific scenarios. It should be noted that the following embodiments do not represent all usage scenarios.

In some embodiments, a model information interaction scenario between a base station and an AI entity is provided. The base station transmits a request message to the AI entity at the base station, and consults AI model information supported by the AI entity. The request message may be a CurrentModelInfoRequest message which is a periodic request message. After receiving the request message from the base station, the AI entity at the base station returns a response message which indicates to the base station a model supported by the AI entity and relevant model information. The response message may be a CurrentModelInfoResponse message. In the embodiments, through the model information interaction between the base station and the AI entity at the base station, the base station can know the currently supported model information, which helps the base station to broadcast correct model information in a current cell and facilitates implementation of model updating at the UE.

In some embodiments, another model information interaction scenario between a base station and an AI entity is provided. After model updating is completed by an AI entity at a base station under Operation Administration and Maintenance (OAM) operation, the AI entity actively transmits a model updating message to the base station to notify the base station of an update of the model at the network and updated model information, such as through an ModelInfoUpdate message. After receiving the model updating message from the AI entity, the base station updates stored model information according to the model information included in the model updating message. After completing the model updating, the base station responds to the AI entity at the base station with a model updating completion message, which may be a ModelInfoUpdateComplete message. In the embodiments, through the model information interaction between the base station and the AI entity at the base station, the base station can know the currently supported model information, which helps the base station to broadcast correct model information in the current cell and facilitates implementation of model updating at the UE.

In some embodiments, a scenario of broadcasting AI model information at a base station is provided. After the base station completes interaction with an AI entity at the base station on model information, the base station broadcasts supported AI model information in a current cell, which may be through system information SIB or other means. The AI model information may include but not limited to one or more of following information: an identifier of the model, a version number of the model, a validity period of the model, a type of the model, a volume of the model, and accuracy of the model. In the embodiments, broadcasting the supported AI model information in the cell may enhance the UE's perception of the model information at the network. When an update of a network model exists, the UE can detect it in time and make a response to initiate a model updating procedure to ensure performance of the model at the UE.

In some embodiments, a scenario of a UE in an idle state/inactive state triggering model updating is provided. The UE receives a broadcast message of a current cell and compares model information included in the received broadcast message with currently stored model information. If there is a model information update, for example, a version of the model updates, the UE actively initiates a model updating request to the network. In the embodiments, as the broadcast message includes the model information supported by the current cell, when the UE detects that the model has been updated according to the broadcast message, the UE can directly initiate a model updating request to the network, requesting the network to assist in the model updating at the UE, which is beneficial to maintain the latest AI model at the UE, and guarantee performance of the AI model and introduction of new features.

In some embodiments, a scenario of a UE in a connected state triggering model updating is provided (expiration of a validity timer may exist in an idle state/inactive state). When a validity timer of an AI model at the UE expires, the UE may notify a network via RRC signaling that the AI model at the UE needs to be updated. The RRC signaling may be UEAssistanceInformation. The UE may include information of the model that needs to be updated in the RRC signaling. When the timer expires, a model at the network may also haven't been updated, a result of triggering the model updating procedure at this time may only be to restart the validity timer of the model, without occurrence of an actual model updating procedure. When the validity timer in the idle/inactive state expires, UE actively enters the connected state, and returns to a previous state after the model updating is completed. In the embodiments, the model updating procedure is triggered for the model whose validity timer has expired, which ensures that the model at the UE is in the latest state, and guarantee performance of the AI model and introduction of new features.

In some embodiments, a scenario of a UE in a connected state triggering model updating is provided (degradation of performance of a model may exist in an idle state/inactive state). When the UE detects that the performance of the model is lower than an expected threshold, UE notifies the network via RRC signaling that an AI model at the UE needs to be updated. The RRC signaling may be UEAssistanceInformation. The UE may include information of the model to be updated in the RRC signaling, or additionally include data information of update of an auxiliary model. The expected threshold may be a fixed value issued by the network, or a performance value of a traditional communication algorithm. When performance of the model in the idle/inactive state declines, the UE may actively enter the connected state, and returns to a previous state after the model updating is completed. In the embodiments, based on comparison, when the performance of the model drops below the expected threshold, the UE may initiate the model updating procedure, which is beneficial to ensure the performance of the model, and prevent serious degradation of the performance of the model from affecting communication performance and reducing user experience.

In some embodiments, a scenario of a UE in an idle state/inactive state triggering model updating is provided. When a validity timer of an AI model at the UE expires, the UE may enter a connected state, and then notifies the network through RRC signaling that the AI model at the UE needs to be updated. The RRC signaling may be UEAssistanceInformation. The UE may include information of the model that needs to be updated in the RRC signaling. In the embodiments, the model updating procedure is triggered for the model whose validity timer has expired, which ensures that the model at the UE is in the latest state, and guarantee performance of the AI model and introduction of new features.

In some embodiments, a scenario of a UE in an idle state/inactive state triggering model updating is provided. When the UE detects that model performance of a model is lower than an expected threshold, the UE may enter a connected state, and then notifies the network through RRC signaling that the AI model at the UE needs to be updated. The RRC signaling may be UEAssistanceInformation. The UE may include information of the model that needs to be updated in the RRC signaling, or additionally include data information of update of an auxiliary model. The expected threshold may be a fixed value issued by the network, or a performance value of a traditional communication algorithm. In the embodiments, based on comparison, when the performance of the model drops below the expected threshold, the UE may initiate the model updating procedure, which is beneficial to ensure the performance of the model, and prevent serious degradation of the performance of the model from affecting communication performance and reducing user experience.

In some embodiments, a model updating procedure for a UE in a connected state is provided. The model updating procedure includes following steps. The UE meets the situations as described in above-mentioned embodiments where the model updating procedure is triggered at the UE in the connected state. The UE in the connected state indicates through RRC signaling (such as a UEAssistancecInformation message) to the gNB that it is determined that an update for a model is required at the UE. Optionally, the UE may first fall back to using a traditional communication algorithm, and then switch back to using an AI model after the model updating is completed. The UE reports the model for which an update is required and relevant model information, such as an identifier or a version number of the model. This information may be included in a non-NAS container of RRC signaling. The gNB initiates a model updating request to an AI entity, and forwards model information of the UE to the AI entity. A model updating request signaling may be AIModelUpdateRequest. The AI entity returns a model updating response message which may be AIModelUpdateRequestResponse and indicates to the base station whether the AI entity can satisfy an AI model requested to be updated. If the AI entity can support the AI model requested to be updated, the AI entity updates the AI model at the UE via a message, such as AIModelDistribution AIModelUpdate. After the model updating procedure is completed, the UE switches back from using a traditional method to using the AI model. The embodiments provide a model updating procedure for the UE in the connected state to ensure implementation of model updating at the UE, which may ensure performance of the model at the UE, provide guarantee for normal operation of communication network functions, and improve user experience.

In some embodiments, a model updating procedure for a UE in an idle/inactive state is provided. The model updating procedure includes following steps. The UE meets the situations as described in above-mentioned embodiments where the model updating procedure is triggered at the UE in the idle/inactive state. The UE in the idle/inactive state enters a connected state, and then indicates through RRC signaling (such as a UEAssistancecInformation message) to the gNB that it is determined that an update for a model is required at the UE. Optionally, the UE may first fall back to using a traditional communication algorithm, and then switch back to using an AI model after the model updating is completed. The UE reports the model for which an update is required and relevant model information, such as an identifier or a version number of the model. This information may be included in a non-NAS container of RRC signaling. The gNB initiates a model updating request to an AI entity, and forwards model information of the UE to the AI entity. A model updating request signaling may be AIModelUpdateRequest. The AI entity returns a model updating response message which may be AIModelUpdateRequestResponse and indicates to the base station whether the AI entity can satisfy an AI model requested to be updated. If the AI entity can support the AI model requested to be updated, the AI entity updates the AI model at the UE via a message, such as AIModelDistribution AIModelUpdate. After the model updating procedure is completed, the UE switches back from using a traditional method to using the AI model, and returns to a previous state (i.e., the idle/inactive state). The embodiments provide a model updating procedure for the UE in the idle/inactive state to ensure implementation of model updating at the UE, which may ensure performance of the model at the UE, provide guarantee for normal operation of communication network functions, and improve user experience.

In some embodiments, a model updating procedure for a UE in an idle/inactive state is provided. The model updating procedure includes following steps. The UE meets the situations as described in above-mentioned embodiments where the model updating procedure is triggered at the UE in the idle/inactive state. If a model update exists, the UE switches to a connected state, and interacts with a gNB and an AI entity to actively update a model. The UE transmits to the gNB an RRC message such as a model issuing request or a model updating request, for example, an AIModelDistributionRequest/AIModelUpdateRequest message, to request to the network for model updating. The gNB forwards the UE's request message to the AI entity. The AI entity responds to the UE's request message and updates the model via a message, such as AIModelDistribution AIModelUpdate. After the model updating is completed, the UE returns to a previous state (i.e., the idle or inactive state). As a cell broadcast message includes model information supported by a current cell, when detecting that there is a model updating request according to the broadcast message, the UE may directly initiate a model updating request to the network, requesting the network to assist in updating the model at the UE. The embodiments provide a model updating procedure for the UE in the idle/inactive state to ensure implementation of model updating at the UE, which may ensure performance of the model at the UE, provide guarantee for normal operation of communication network functions, and improve user experience.

In some embodiments, a model updating procedure for a UE in a connected state is provided. The model updating procedure includes following steps. When reporting a measurement report, the UE in the connected state adds existing model information at the UE into it. The gNB receives the model information reported by the UE, adds state information at a base station, and forward the information to an AI entity via a message, such as AIModelUpdateRequest. The state information at the base station may include a state of an L2 buffer, a data rate, a packet arrival interval and other information. The AI entity determines whether to actively initiate model updating based on the above information (This part belongs to network implementation). The AI entity returns a model updating response message which may be AIModelUpdateRequestResponse and indicates whether the AI entity can satisfy the requested AI model. The AI entity updates the AI model at the UE via a message, such as AIModelDistribution AIModelUpdate. The UE completes the model updating procedure. The embodiments provide a model updating procedure for the UE in the connected state to ensure implementation of model updating at the UE, which may ensure performance of the model at the UE, provide guarantee for normal operation of communication network functions, and improve user experience.

In some embodiments, a model updating procedure for a UE in a connected state is provided. The model updating procedure includes following steps. A gNB maintains current model information for the UE in the connected state. After an update for a model deployed at an AI entity is completed, the AI entity notifies the gNB of its updated model information. The gNB compares update information of the AI entity with the model information currently used by the UE to determine whether to initiate a model updating procedure. If the gNB detects that some models at the UE can be updated, the gNB transmits a model issuing or model updating request message to the AI entity via a message, such as AIModelDistribution AIModelUpdate, to notify the AI entity to initiate the model updating procedure to the UE. The AI entity responds to the request message from the gNB, and performs model updating via a message, such as AIModelDistribution AIModelUpdate. The UE completes the model updating procedure. The embodiments provide a model updating procedure for the UE in the connected state to ensure implementation of model updating at the UE, which may ensure performance of the model at the UE, provide guarantee for normal operation of communication network functions, and improve user experience.

In some embodiments, a model updating procedure for a UE in an inactive state is provided. The model updating procedure includes following steps. A gNB maintains current model information for the UE. After an update for a model deployed at an AI entity is completed, the AI entity notifies the gNB of its updated model information. The gNB compares update information of the AI entity with the model information currently used by the UE to determine whether to initiate a model updating procedure. If the gNB detects that some models at the UE can be updated, the gNB indicates, through paging, the UE to switch to the connected state to prepare for the model updating procedure. The gNB transmits a model issuing or model updating request message to the AI entity via a message, such as AIModelDistribution AIModelUpdate, to notify the AI entity to initiate the model updating procedure to the UE. The AI entity responds to the request message from the gNB, and performs model updating via a message, such as AIModelDistribution AIModelUpdate. The UE completes the model updating procedure, and returns to the inactive state. The embodiments provide a model updating procedure for the UE in the inactive state to ensure implementation of model updating at the UE, which may ensure performance of the model at the UE, provide guarantee for normal operation of communication network functions, and improve user experience.

Figure 6:
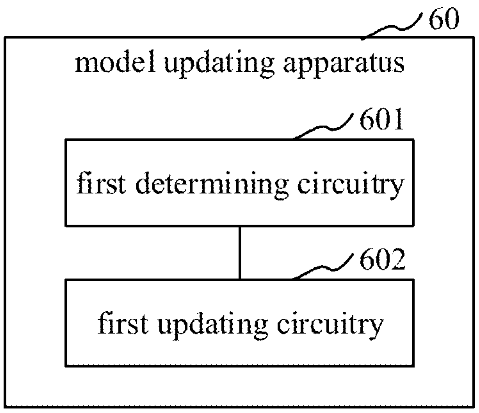
FIG. 6 is a structural diagram of a model updating apparatus according to an embodiment.

Referring to FIG. 6, FIG. 6 is a structural diagram of a model updating apparatus 60 according to an embodiment. The apparatus 60 includes a first determining circuitry 601 and a first updating circuitry 602.

The first determining circuitry 601 is configured to determine whether an update for a locally deployed model is required.

The first updating circuitry 602 is configured to cooperate with a network to update the locally deployed model based on determining that the update for the locally deployed model is required.

More details of working principles and working modes of the apparatus 60 as shown in FIG. 6 can be referred to related descriptions of FIG. 1 and are not repeated here.

In some embodiments, the apparatus 60 may correspond to a chip with a model updating function in a terminal (i.e., a UE), or to a chip with a data processing function, such as a System-On-Chip (SOC) or a baseband chip, or to a chip module including a chip with a model updating function in the UE, or to a chip module including a chip with a data processing function, or to the UE.

Figure 7:
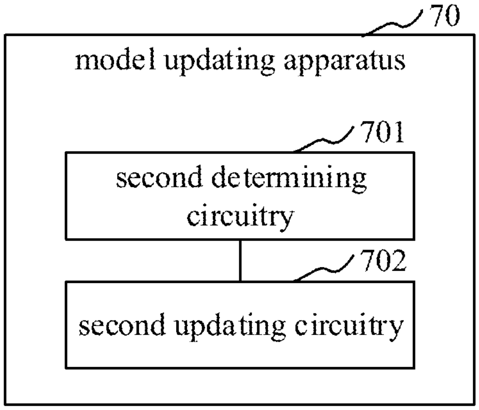
FIG. 7 is a structural diagram of a model updating apparatus according to an embodiment.

Referring to FIG. 7, FIG. 7 is a structural diagram of a model updating apparatus 70 according to an embodiment. The apparatus 70 includes a second determining circuitry 701 and a second updating circuitry 702.

The second determining circuitry 701 is configured to determine whether an update for a model deployed at a terminal is required.

The second updating circuitry 702 is configured to cooperate with the terminal to update the model deployed at the terminal based on determining that the update for the model deployed at the terminal is required.

More details of working principles and working modes of the apparatus 70 as shown in FIG. 7 can be referred to related descriptions of FIG. 2 and are not repeated here.

In some embodiments, the apparatus 70 may correspond to a chip with a model updating function in a network device (such as a base station), or to a chip with a data processing function, such as an SOC or a baseband chip, or to a chip module including a chip with a model updating function in the network device, or to a chip module including a chip with a data processing function, or to the network device.

In some embodiments, each module/unit of each apparatus and product described in the above embodiments may be a software module/unit or a hardware module/unit or may be a software module/unit in part, and a hardware module/unit in part.

For example, for each apparatus or product applied to or integrated in a chip, each module/unit included therein may be implemented by hardware such as circuits; or, at least some modules/units may be implemented by a software program running on a processor integrated inside the chip, and the remaining (if any) part of the modules/units may be implemented by hardware such as circuits. For each apparatus or product applied to or integrated in a chip module, each module/unit included therein may be implemented by hardware such as circuits. Different modules/units may be disposed in a same component (such as a chip or a circuit module) or in different components of the chip module. Or at least some modules/units may be implemented by a software program running on a processor integrated inside the chip module, and the remaining (if any) part of the modules/units may be implemented by hardware such as circuits. For each apparatus or product applied to or integrated in a terminal, each module/unit included therein may be implemented by hardware such as circuits. Different modules/units may be disposed in a same component (such as a chip or a circuit module) or in different components of the terminal. Or at least some modules/units may be implemented by a software program running on a processor integrated inside the terminal, and the remaining (if any) part of the modules/units may be implemented by hardware such as circuits.

In an embodiment of the present disclosure, a storage medium having computer instructions stored therein is provided, wherein when the computer instructions are executed by a processor, any one of the above methods is performed.

In an embodiment of the present disclosure, a terminal including the apparatus 60 as shown in FIG. 6 or including a memory and a processor is provided, wherein the memory has a computer program stored therein, and when the processor executes the computer program, the above method as shown in FIG. 1 is performed.

In an embodiment of the present disclosure, a network device including the apparatus 70 as shown in FIG. 7 or including a memory and a processor is provided, wherein the memory has a computer program stored therein, and when the processor executes the computer program, the above method as shown in FIG. 2 is performed.

In the embodiments of the present disclosure, the processor may be a Central Processing Unit (CPU), or other general processors, Digital Signal Processors (DSPs), Application Specific Integrated Circuits (ASICs), Field Programmable Gate Arrays (FPGAs) or other Programmable logic devices, discrete gates or transistor logic devices, discrete hardware components, and the like. A general processor may be a microprocessor, or the processor may be any conventional processor or the like.

It should also be understood that the memory in the embodiments of the present disclosure may be either volatile memory or nonvolatile memory or may include both volatile and nonvolatile memories. The non-volatile memory may be a Read-Only Memory (ROM), a Programmable ROM (PROM), an Erasable PROM (EPROM), an electrically Erasable EPROM (EEPROM), or a flash memory. The volatile memory may be a Random Access Memory (RAM) which functions as an external cache. By way of example but not limitation, various forms of RAM are available, such as Static Random Access Memory (SRAM), Dynamic Random Access Memory (DRAM), Synchronous Dynamic Random Access Memory (SDRAM), Double Data Rate Synchronous Dynamic Random Access Memory (DDR SDRAM), Enhanced SDRAM (ESDRAM), Synchronous connection to DRAM (SLDRAM), and Direct Rambus RAM (DR-RAM).

It should be understood that the term "and/or" in the present disclosure is merely an association relationship describing associated objects, indicating that there can be three types of relationships, for example, A and/or B can represent "A exists only, both A and B exist, B exists only. In addition, the character "/" in the present disclosure represents that the former and latter associated objects have an "or" relationship.

The "plurality" in the embodiments of the present disclosure refers to two or more.

The descriptions of the first, second, etc. in the embodiments of the present disclosure are merely for illustrating and differentiating the objects, and do not represent the order or the particular limitation of the number of devices in the embodiments of the present disclosure, which do not constitute any limitation to the embodiments of the present disclosure.

The "connection" in the embodiments of the present disclosure refers to various connection ways such as direct connection or indirect connection to realize communication between devices, which is not limited in the embodiments of the present disclosure.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

The invention claimed is:

1. A model updating method, comprising:

detecting performance of a locally deployed model, wherein the locally deployed model is used to enhance communication network functions or calculation of signals and/or parameters in communication;

determining whether an update for the locally deployed model is required, wherein said determining whether the update for the locally deployed model is required comprises:

determining that the update for the locally deployed model is required in response to the performance of the locally deployed model falling below an expected threshold;

cooperating with a network to update the locally deployed model based on determining that the update for the locally deployed model is required; and when the updating the locally deployed model, first falling back to use a traditional communication algorithm or use other alternative local artificial intelligence (AI) models.

2. The method according to claim 1, wherein prior to said determining whether the update for the locally deployed model is required, the method further comprises:

obtaining attribute information of the locally deployed model;

said determining whether the update for the locally deployed model is required further comprises: determining whether the update for the locally deployed model is required based on the attribute information; and said cooperating with the network to update the locally deployed model comprises: initiating a model updating procedure to the network to interact with the network on update data, wherein the update data is used to update the locally deployed model.

3. The method according to claim 2, wherein the attribute information comprises at least one of following: an identifier of the model, a version number of the model, a validity period of the model, a type of the model, a volume of the model, or accuracy of the model.

4. The method according to claim 3, wherein prior to said determining whether the update for the locally deployed model is required, the method further comprises: receiving model information from the network, wherein the model information comprises at least one of the identifier of the model, the version number of the model, the validity period of the model, the type of the model, the volume of the model, or the accuracy of the model; and said determining whether the update for the locally deployed model is required based on the attribute information comprises: comparing the model information with the attribute information to determine whether an updated model exists in the network; and determining that the update for the locally deployed model is required based on that the updated model exists in the network.

5. The method according to claim 3, wherein based on that the attribute information comprises the validity period of the model, said determining whether the update for the locally deployed model is required further comprises:

determining that the update for the locally deployed model is required in response to the validity period of the model expiring.

6. The method according to claim 2, wherein based on that the attribute information comprises the validity period of the model, said determining whether the update for the locally deployed model is required further comprises:

determining that the update for the locally deployed model is required in response to the validity period of the model expiring.

7. The method according to claim 1, wherein the expected threshold is received from the network or is acquired locally.

8. The method according to claim 1, wherein said determining whether the update for the locally deployed model is required further comprises: determining that the update for the locally deployed model is required in response to receiving a model updating instruction from the network, wherein the model updating instruction is transmitted to a terminal when the network determines that an update for a model deployed at the terminal is required; and said cooperating with the network to update the locally deployed model comprises:

interacting with the network on update data, wherein the update data is used to update the locally deployed model.

9. The method according to claim 8, further comprising:

transmitting relevant information of the locally deployed model to the network, wherein the relevant information enables the network to determine whether the update for the model deployed at the terminal transmitting the relevant information is required.

10. The method according to claim 9, wherein the relevant information exists in Radio Resource Control (RRC) signaling, or in a Network Attached Storage (NAS) container of RRC signaling, or in a non-NAS container of RRC signaling.

11. The method according to claim 9, wherein the relevant information is reported to the network along with a measurement report.

12. The method according to claim 9, wherein the model updating instruction is carried by paging information or system information based on being in a disconnected state; and following receiving the model updating instruction from the network, the method further comprises: switching from the disconnected state to a connected state to cooperate with the network to update the locally deployed model; and resuming the disconnected state after update for the locally deployed model is completed.

13. The method according to claim 9, wherein the model updating instruction is carried by RRC signaling based on being in a connected state.

14. The method according to claim 8, wherein the model updating instruction is carried by paging information or system information based on being in a disconnected state; and following receiving the model updating instruction from the network, the method further comprises: switching from the disconnected state to a connected state to cooperate with the network to update the locally deployed model; and resuming the disconnected state after update for the locally deployed model is completed.

15. The method according to claim 8, wherein the model updating instruction is carried by RRC signaling based on being in a connected state.

16. A non-transitory storage medium storing one or more programs, the one or more programs comprising computer instructions, which, when executed by a processor, cause the processor to:

detect performance of a locally deployed model, wherein the locally deployed model is used to enhance communication network functions or calculation of signals and/or parameters in communication;

determine whether an update for the locally deployed model is required, wherein said determining whether the update for the locally deployed model is required comprises: determining that the update for the locally deployed model is required in response to the performance of the locally deployed model falling below an expected threshold;

cooperate with a network to update the locally deployed model based on determining that the update for the locally deployed model is required; and when the updating the locally deployed model, first fall back to use a traditional communication algorithm or use other alternative local artificial intelligence (AI) models.

17. A terminal, comprising a memory and processor, wherein the memory stores one or more programs, the one or more programs comprising computer instructions, which, when executed by the processor, cause the processor to:

detect performance of a locally deployed model, wherein the locally deployed model is used to enhance communication network functions or calculation of signals and/or parameters in communication;

determine whether an update for the locally deployed model is required, wherein said determining whether the update for the locally deployed model is required comprises:

determining that the update for the locally deployed model is required in response to the performance of the locally deployed model falling below an expected threshold;

cooperate with a network to update the locally deployed model based on determining that the update for the locally deployed model is required; and when the updating the locally deployed model, first fall back to use a traditional communication algorithm or use other alternative local artificial intelligence (AI) models.

18. The terminal according to claim 17, wherein the processor is further caused to obtain attribute information of the locally deployed model;

said determining whether the update for the locally deployed model is required further comprises: determining whether the update for the locally deployed model is required based on the attribute information; and said cooperating with the network to update the locally deployed model comprises: initiating a model updating procedure to the network to interact with the network on update data, wherein the update data is used to update the locally deployed model.

19. The terminal according to claim 17, wherein said determining whether the update for the locally deployed model is required further comprises: determining that the update for the locally deployed model is required in response to receiving a model updating instruction from the network, wherein the model updating instruction is transmitted to the terminal when the network determines that an update for a model deployed at the terminal is required; and said cooperating with the network to update the locally deployed model comprises:

interacting with the network on update data, wherein the update data is used to update the locally deployed model.

* * * * *